(12) United States Patent  (10) Patent No.: US 7,874,250 B2
Veneruso  (45) Date of Patent: Jan. 25, 2011

(54) NANO-BASED DEVICES FOR USE IN A WELLBORE

(75) Inventor: Anthony F. Veneruso, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 1475 days.

(21) Appl. No.: 11/164,144

(22) Filed: Nov. 11, 2005

(65) Prior Publication Data

US 2010/0229749 A1    Sep. 16, 2010

Related U.S. Application Data

(60) Provisional application No. 60/593,730, filed on Feb. 9, 2005.

(51) Int. Cl.
*F42B 3/00* (2006.01)
(52) U.S. Cl. .............. 102/322; 102/200; 102/207; 137/68.13; 361/248
(58) Field of Classification Search ............... 102/322, 102/200, 207; 137/68.13; 361/248
See application file for complete search history.

(56) References Cited

U.S. PATENT DOCUMENTS

| | | | | |
|---|---|---|---|---|
| 4,393,779 A * | 7/1983 | Brede et al. | ............... | 102/202.5 |
| 5,088,413 A * | 2/1992 | Huber et al. | ............... | 102/202.5 |
| 5,571,985 A * | 11/1996 | Ritter et al. | ............... | 102/217 |
| 5,621,184 A * | 4/1997 | Gwynn, III | ............... | 102/215 |
| 5,731,538 A * | 3/1998 | O'Brien et al. | ............... | 102/202.5 |
| 6,386,108 B1 | 5/2002 | Brooks et al. | | |
| 7,051,655 B1 * | 5/2006 | Moulard et al. | ............... | 102/201 |
| 7,094,123 B2 * | 8/2006 | Oyama et al. | ............... | 445/50 |
| 7,191,706 B2 * | 3/2007 | Chase et al. | ............... | 102/217 |
| 7,218,193 B2 * | 5/2007 | Greywall | ............... | 335/78 |
| 7,236,345 B1 * | 6/2007 | Roesler et al. | ............... | 361/247 |
| 7,557,433 B2 * | 7/2009 | McCain | ............... | 257/678 |
| 7,608,478 B2 * | 10/2009 | Gangopadhyay et al. | ............... | 438/106 |
| 7,629,604 B2 * | 12/2009 | Veneruso et al. | ............... | 257/29 |
| 2002/0048135 A1 | 4/2002 | Lerche et al. | | |
| 2002/0053434 A1 * | 5/2002 | Chen et al. | ............... | 166/297 |
| 2002/0062991 A1 * | 5/2002 | Farrant et al. | ............... | 175/4.55 |
| 2002/0175617 A1 * | 11/2002 | Lee et al. | ............... | 313/495 |
| 2003/0067259 A1 * | 4/2003 | Nishimura | ............... | 313/310 |
| 2003/0200890 A1 | 10/2003 | Reynolds et al. | | |
| 2004/0003743 A1 | 1/2004 | Brooks et al. | | |
| 2004/0099171 A1 * | 5/2004 | Davis | ............... | 102/218 |
| 2004/0149679 A1 | 8/2004 | Song et al. | | |
| 2004/0160726 A1 | 8/2004 | Lerche et al. | | |

(Continued)

FOREIGN PATENT DOCUMENTS

EP    1251562 A1    10/2002

(Continued)

OTHER PUBLICATIONS

U.S. Appl. No. 11/164,118, filed Nov. 10, 2005, Veneruso, et al.

(Continued)

*Primary Examiner*—Michelle Clement
(74) *Attorney, Agent, or Firm*—Trop, Pruner & Hu, P.C.; Kevin B. McGoff; Rodney V. Warfford

(57) ABSTRACT

An apparatus includes a component for use in a wellbore, and a nano-based device for activating the component.

25 Claims, 2 Drawing Sheets

U.S. PATENT DOCUMENTS

| | | | |
|---|---|---|---|
| 2005/0178282 A1 | 8/2005 | Brooks et al. | |
| 2005/0190525 A1* | 9/2005 | Jennings, III | 361/247 |
| 2006/0207461 A1* | 9/2006 | Koekemoer et al. | 102/206 |
| 2006/0267167 A1* | 11/2006 | McCain | 257/678 |
| 2007/0039671 A1* | 2/2007 | Desilets et al. | 149/46 |
| 2007/0105249 A1* | 5/2007 | Veneruso et al. | 438/20 |
| 2008/0066835 A1* | 3/2008 | Desilets et al. | 149/46 |
| 2008/0307993 A1* | 12/2008 | Chan et al. | 102/214 |
| 2009/0168606 A1* | 7/2009 | Lerche et al. | 367/197 |
| 2009/0188379 A1* | 7/2009 | Hiza et al. | 86/50 |
| 2009/0193993 A1* | 8/2009 | Hummel et al. | 102/215 |
| 2009/0301333 A1* | 12/2009 | Teowee et al. | 102/217 |

FOREIGN PATENT DOCUMENTS

| | | |
|---|---|---|
| GB | 2411222 A | 8/2005 |

OTHER PUBLICATIONS

Teo et al., Fabrication and electrical characteristics of carbon nanotube-based microcathodes for use in a parallel electron-beam lithography system, J. Vac. Sci. Technol. B21(2), Mar./Apr. 2003, 693-697.

Milne et al., Carbon nanotubes as field emission sources, J. Mater. Chem., 2004, 14, 1-12.

Knight, Controllable nano-diode created, newScientist.com, 15:12, Jul. 8, 2004, 2 pp.

Lee et al., Carbon nonotube p-n junction diodes, Appl. Phys. Lett., vol. 85, No. 1, Jul. 5, 2004, 145-147.

Rupesinghe et al., Field emission vacuum power switch using vertically aligned carbon nanotubes, J. Vac. Sci. Technol. B, vol. 21, No. 1, Jan./Feb. 2003, 338-343.

Teo, et al., Field emission from dense, sparse, and patterned arrays of carbon nanofibers, Appl. Phys. Lett., vol. 80, No. 11, Mar. 18, 2002, 2011-2013.

Nanotube, http://whatis.techtarget.com/definition/0,,sid9_gci514287,00.html, Jun. 5, 2004, 3 pp.

Carbon nanotube, http://wikipedia.org/wiki/Carbon_nanotube, Aug. 17, 2005, 6 pp.

Harris, Carbon nanotube science and technology, http://www.personal.rdg.ac.uk/~scsharip/tubes.htm, 6 pp.

Tommy, Diamond Nanotube Technology Promises New Electronics Products, www.linuxelectrons.com/article.php/20050804100641554, Aug. 4, 2005, 3 pp.

Nanotubes and Buckyballs, Nanotechnology Now, http://www.nanotech-now.com/nanotube-buckyball-sites.htm, Apr. 13, 2005, 6 pp.

* cited by examiner

NANO-BASED DEVICES FOR USE IN A WELLBORE

CROSS-REFERENCE TO RELATED APPLICATIONS

This application claims the benefit of U.S. Patent Application Ser. No. 60/593,730, entitled "Microelectromechanical Devices," filed Feb. 9, 2005, which is hereby incorporated by reference.

BACKGROUND

Electronic devices are often used in wellbore applications for activating downhole devices, such as detonators, valves, packers, and so forth. Examples of electronic devices include diodes and switches. A popular type of electronic device is the semiconductor electronic device, such as a semiconductor diode or a semiconductor transistor that forms a switch.

A shortcoming of semiconductor electronic devices is that they exhibit reduced reliability in a high temperature environment, such as in a wellbore. The leakage current of a semiconductor diode increases exponentially with temperature. Reliable operation may thus not be achievable when using such semiconductor diodes at high temperatures, particularly if the semiconductor diodes are left in the high temperature wellbore environment for long periods of time (e.g., many days). Switches implemented with semiconductor devices also exhibit reduced reliability at high temperature.

High-voltage operation of tools is often employed for wellbores. For example, high voltages are used to fire detonators associated with perforating guns. Activating voltages for detonators of perforating guns can be as high as 1,400 volts DC (or even higher). Typical semiconductor devices, including diodes or transistors, are typically unable to reliably operate under such high-voltage conditions. To address this, special diodes or transistors (referred to as power diodes or transistors) are utilized. Some shortcomings of such high-voltage semiconductor devices are their relatively high cost, low reliability, and relatively high leakage current, especially at high temperatures.

SUMMARY

In general, according to an embodiment, an apparatus comprises a component for use in a wellbore, and a nano-based device for activating the component.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via another element". As used herein, the terms "up" and "down", "upper" and "lower", "upwardly" and "downwardly", "upstream" and "downstream"; "above" and "below"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

Generally, nano-based devices (also referred to as "nano-electronic devices") are provided for use in a wellbore environment. Examples of a nano-based device include a nano-diode, a nano-switch, or a combined nano-diode and nano-switch. As used here, the term "nano-based device" refers to any device that includes nanotechnology-based features. Examples of nanotechnology-based features include nano-emitters, implemented as carbon nanotubes or nano-sized diamonds, which are capable of emitting electrons.

The nano-based device can be used in a detonator in the wellbore environment, where the detonator is used for activating explosives (such as explosives in perforating guns). In other applications, nano-based devices can be used with other tools or components within a wellbore. A benefit of using nano-based devices is that they are reliable at high temperature (e.g., temperature greater than 100° C.) and high voltage (e.g., voltage greater than 100 volts and as high as 1,000 volts or higher). For example, certain types of nano-based devices can operate efficiently and reliably for a long life at temperatures up to 100° C. or greater. Also, nano-based devices are able to withstand voltages as high as 1,000 volts or greater.

Figure 1:
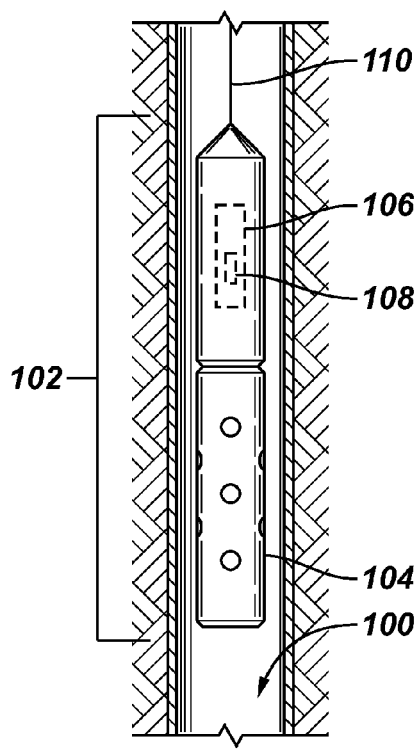
FIG. 1 illustrates a tool for use in a wellbore, according to an embodiment.

FIG. 1 shows a tool 102 that is deployed within a wellbore 100. A wellbore 100 can be a wellbore that extends through one or more reservoirs in a surrounding formation, where such reservoirs contain hydrocarbons. In alternative embodiments, the wellbore 100 can extend through reservoirs containing other fluids, such as water and others. Also, the wellbore 100 can also be used in mining applications or any other application in which the tool 102 is lowered into a high temperature environment. A high temperature environment is an environment with temperatures that exceed 100° C. Although it is advantageous in high temperature applications, some embodiments of the invention may be used in environments at lower temperatures than 100° C., for example in water extraction or injections wells, hydrocarbon storage, or $CO_2$ sequestration wells.

In one example implementation, the tool 102 includes a gun 104 (such as a perforating gun for creating perforations in the surrounding formation to enable communication of fluids between the wellbore 100 and the surrounding reservoir). Alternatively, the tool 102 can include other types of components. The gun 104 is coupled to a detonator 106 according to some embodiments. The detonator 106 includes one or more nano-based devices 108 that can reliably operate in the high temperature environment of the wellbore 100. Also, the nano-based devices 108 are also capable of reliably operating at high voltages (e.g., greater than 1,000 volts).

Activation of the detonator 106 is controlled by electrical communication through a cable 110 that extends from the tool 102 to another location further up the wellbore 100 (such as at the earth surface of the wellbore 100). Activation of the detonator 106 involves activation of the nano-based device, which in turn provides an activation signal to the gun 104. Alternatively, with a tool that includes other types of components, activation of the nano-based device causes an activation signal to be provided to such other components to enable these components to perform predetermined tasks in the wellbore. Activation of the detonator may also be achieved by alternative means, such as a battery powered downhole device that is activated remotely by pressure transmitted signals, wireless telemetry commands or a pre-programmed timing device or some appropriate combination of these.

Figure 2:
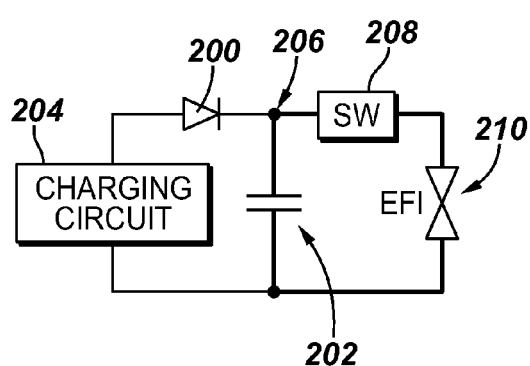
FIG. 2 is a circuit diagram of a detonator, according to an embodiment.

FIG. 2 is circuit diagram of a detonator circuit that is part of the detonator 106 of FIG. 1. The detonator circuit of FIG. 2 includes a nano-diode 200 that has a cathode electrode coupled to a common node (or common connection point) 206, which is electrically coupled to an electrode of a capacitor 202. The nano-diode 200 also includes an anode electrode electrically coupled to the output of a charging circuit 204. The charging circuit 204 provides a charging current and voltage through the nano-diode 200 to charge the capacitor 202. The nano-diode 200 is off when less than a predefined voltage is applied across the nano-diode 200. However, if a voltage greater than or equal to the predefined voltage is applied across the nano-diode 200, the nano-diode 200 turns on to allow positive electrical current to flow through the nano-diode 200 from the anode electrode to the cathode electrode, thereby storing electrical energy in the capacitor by charging the capacitor to a positive voltage.

The charging circuit 204 can be provided locally with the detonator 106 of FIG. 1. Alternatively, the charging circuit 204 can be located at the earth surface, with electrical charge provided down the cable 110 to charge the capacitor 202. Effectively, the capacitor 202 acts as a storage device for storing charge from the charging circuit 204.

The common node 206 is also electrically coupled to a switch 208. The switch 208 can either be implemented as a spark gap switch, a semiconductor switch, or a nano-switch.

The switch 208, when activated by an activating signal, allows the communication of activating current from the capacitor 202 to an initiator 210. The activating signal can be a voltage greater than a predefined voltage (note that the predefined voltage for activating the switch 208 can be different from the predefined voltage for activating the nano-diode 200). Alternatively, the activating signal can be provided to a trigger electrode of the switch 208 to turn on the switch 208.

An example of the initiator 210 is an exploding foil initiator (EFI). Alternatively, the initiator 210 can be an exploding bridgewire (EBW) initiator, a semiconductor bridge (SCB) initiator, and so forth. Alternatively, instead of using a capacitor 202, other forms of energy sources can be used in the detonator circuit of FIG. 2.

When the switch 208 turns on to couple electrical charge from the capacitor 202 to the initiator 210, the initiator 210 causes detonation of an explosive material to activate the detonator 106 shown in FIG. 1.

Figure 4:
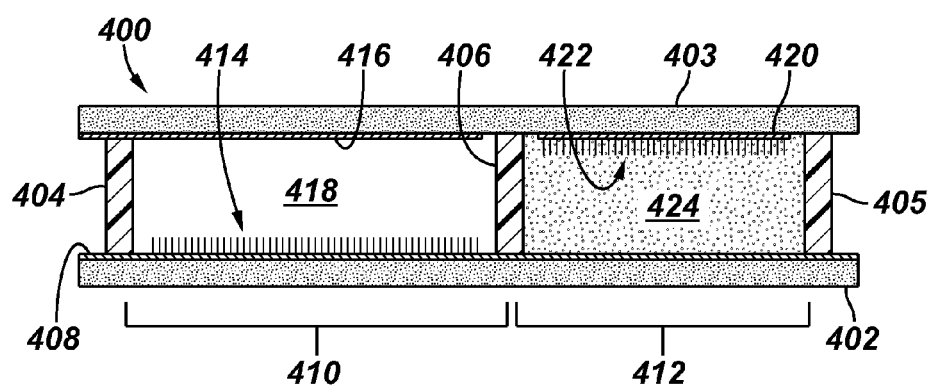
FIG. 4 is a side sectional view of a combined nano-diode and nano-switch for use in the detonator circuit of FIG. 2.

In one embodiment, the nano-diode 200 and switch 208 of FIG. 2 are implemented as discrete components (such as discrete components on a circuit board). Alternatively, the nano-diode 200 and the switch 208 (which can be a nano-switch) can be integrated into an integrated assembly or package as depicted in FIG. 4 (discussed further below). In yet another arrangement, the nano-diode 200 and switch 208 can be implemented as discrete components but can be arranged closed together to provide a closely integrated assembly.

Figure 3:
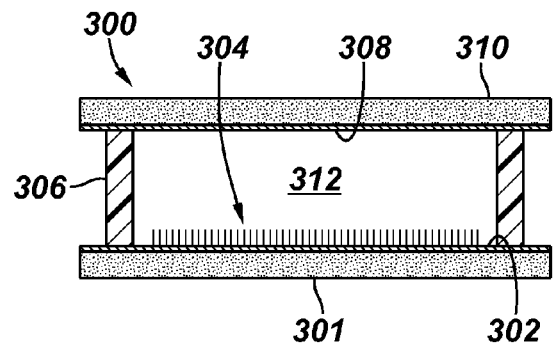
FIG. 3 is a side sectional view of a nano-diode for use in the detonator circuit of FIG. 2.

As shown in FIG. 3, a nano-diode 300 includes a substrate 301 on which a cathode electrode 302 is provided. The substrate 301 can be formed of a number of different materials, including silicon, ceramic, glass, and so forth. The cathode electrode 302 is a layer formed over the substrate 301, where the layer includes an electrically conductive material.

Nanotubes 304 can be formed on a surface of the cathode electrode 302. In one example implementation, the nanotubes 304 are grown (or otherwise formed) on the upper surface of the cathode electrode 302 such that the nanotubes 304 coat the cathode electrode 302. One type of nanotube that can be employed is a carbon nanotube. The carbon nanotubes, in the arrangement of FIG. 3, coat the surface of the cathode electrode 302. Alternatively, the carbon nanotubes may be deposited, or formed onto the cathode electrode in clusters or discrete patterns of carbon nanotubes. Nanotubes can also be formed of other materials, such as silicon, molybdenum, titanium, boron nitride, and so forth.

A nanotube is a generally cylindrical structure formed of a particular material. A nanotube structure is basically a very small tube that has a wall thickness on the atomic scale. For example, a carbon nanotube is a tube in which the walls are formed of carbon molecules, where the wall thickness can be one molecule deep. Carbon nanotubes can be multi-layer, concentric tubes, called multi-walled carbon nanotubes (MWCNTs) or single-walled carbon nanotubes (SWCNTs). A carbon nanotube includes a cylindrical structure of carbon molecules. Carbon nanotubes exhibit certain electrical properties that make them efficient for forming certain types of devices, such as diodes or switches.

Instead of using nanotubes 304 formed on the cathode electrode 302, a nano-sized diamond film can be used instead. "Nano-sized diamond" refers to a diamond crystal having grain size less than some predetermined value (e.g., 100 nanometers). A nano-sized diamond can be formed to a film-like structure. A nano-sized diamond film deposited on a surface using various techniques has relatively excellent electron emission characteristics, in some cases comparable to carbon nanotubes.

An insulating spacer 306 is provided on the cathode electrode 302. An anode electrode 308 is then formed over the spacer 306 such that the anode electrode 308 is spaced apart and thereby electrically insulated from the cathode electrode 302 by a predetermined distance. The anode electrode 308 is an electrically conductive layer that is formed across a surface of an upper cover 310 (which can be formed of various materials, such as silicon, ceramic, and so forth). Examples of materials of the anode electrode 308 include nickel, molybdenum, tantalum, or any other appropriate metal that exhibits a low SE/PE ratio of the number of secondary electrons emitted from the anode electrode compared to the number of primary electrons impacting the anode electrode that originates at the cathode. Other materials with low work function may also be good candidates, such as gold, iridium, palladium, or platinum. Note that the cathode electrode 302 can also be formed of the same material as the anode electrode 308.

The arrangement of the upper cover 310, anode electrode 308, insulating spacer 306, cathode electrode 302, and substrate 301 provides a hermetically-sealed chamber 312 that can be filled with vacuum. Alternatively, the chamber 312 can be filled with a dielectric gas. For example, the dielectric gas can include any of Xenon, Argon, Neon, Helium, and Sulfur hexafluoride.

The nanotubes 304 form nano-emitters that are used for emitting electrons to provide current flow between electrodes 302 and 308 of the nano-diode 300. When a voltage difference is applied between the electrodes 302 and 308, electrons are caused to be emitted from the nano-emitters (provided by the nanotubes 304) such that positive current flows from the anode electrode 308 to the cathode electrode 116 through either the vacuum or gas contained in the chamber 312.

The cathode electrode 302 of the nano-diode depicted in FIG. 3 is electrically coupled to the common node 206 (FIG. 2) such that the cathode electrode 302 is electrically coupled to both the switch 208 and the capacitor 202 depicted in FIG. 2. The anode electrode 308 is electrically coupled to the charging circuit 204 depicted in FIG. 2.

According to one implementation, the nano-diode 300 of FIG. 3 includes a cathode and an anode inside an evacuated (vacuum) envelope. The nano-diode of FIG. 3 resembles a scaled down version of a vacuum diode, with certain key differences. First, there is no filament to heat the cathode. Moreover, electron emission from the nanotubes 304 takes place by a substantially more efficient field emission process. This makes it possible for the nano-diode 300 to operate without the heated filament present in conventional vacuum tubes.

In operation, in response to a voltage of greater than or equal to a predefined voltage developed across the anode and cathode electrodes 302 and 304, electrons are emitted from the nano-emitters (provided by nanotubes 304) such that the electrons flow between the electrodes 302 and 304. Based on an electron flow from the electrode 302 to the electrode 308, positive electrical current flows from the electrode 308 (anode electrode) to the electrode 302 (cathode electrode). When current flows between electrodes 302 and 308, the nano-diode 300 is considered to be "on."

FIG. 4 illustrates an integrated assembly 400 of a combined nano-diode and nano-switch. The assembly 400 includes a nano-diode 410 and a nano-switch 412. The assembly 400 depicted in FIG. 4 includes a substrate 402 and a cover 403 that are spaced apart by insulating spacers 404, 406, and 405. A common electrode 408 is formed as a layer or plate over the substrate 402 (which can be implemented with silicon, ceramic, and so forth).

On the nano-diode 410 side of the common electrode 408, the electrode 408 functions as a cathode electrode. Nano-emitters 414 (which can be nanotubes or nano-sized diamonds) are formed on the portion of the common electrode 408 in the nano-diode 410. Another electrode 416 is formed across a portion of the cover 403 that is part of the nano-diode 410. The electrode 416 functions as the anode electrode for the nano-diode 410. A vacuum is formed in the chamber 418 defined by the substrate 402, common electrode 408, spacers 404 and 406, electrode 416, and cover 403. Operation of the nano-diode 410 is similar to the operation of the nano-diode 300 of FIG. 3.

On the nano-switch side of the assembly 400, another electrode 420 is formed across a portion of the cover 403 that is on the nano-switch side of the assembly 400. The electrode 420 can be the second electrode of the nano-switch (in which current flows between the electrode 420 and electrode 408 when the nano-switch is turned on), or a trigger electrode (for activating the nano-switch). Nano-emitters 422 (which can be nanotubes or nano-sized diamonds) are formed on the electrode 420. A gas is provided in a chamber 424 defined by spacers 405 and 406, substrate 402, common electrode 408, electrode 420, and cover 403. Also, in an alternative embodiment, nano-emitters can also be formed on the segment of the electrode 408 on the nano-switch side of the assembly 400.

Effectively, the spacer 406 acts to separate the two sections (nano-diode 410 and nano-switch 412) by electrically insulating the electrodes 416 and 420 and separating the chamber 418 from the chamber 424. Also, the spacer 406 provides mechanical support, as well as maintains the vacuum seal in the chamber 418 (of the nano-diode 410) and the gas in the chamber 424 (of the nano-switch 412).

In the arrangement of FIG. 4, the common electrode 408 provides the common node 206 depicted in FIG. 2. The nano-diode 410 is used to implement the diode 200 of FIG. 2, and the nano-switch 412 is used to implement the switch 208 of FIG. 2.

In operation, a voltage developed between the electrode 408 and the electrode 416 in the nano-diode 410 causes electrons to flow from the nano-emitters 414 to the electrode 416, such that current flows from the anode electrode 416 to the anode electrode 416.

Also, a voltage of greater than an activation voltage level developed between the electrode 408 and the electrode 420 causes breakdown of the gas inside the chamber 424 of the nano-switch 412, which causes an electrically conductive path to be developed between the electrodes 408 and 420. Electrons emitted from the nano-emitters 422 assist in the breakdown of the gas in the chamber 424. The electrically conductive path between electrodes 408 and 420 allows current to flow from the electrode 408 to the electrode 420 (which corresponds to the "on" position of the nano-switch 412).

Figure 5:
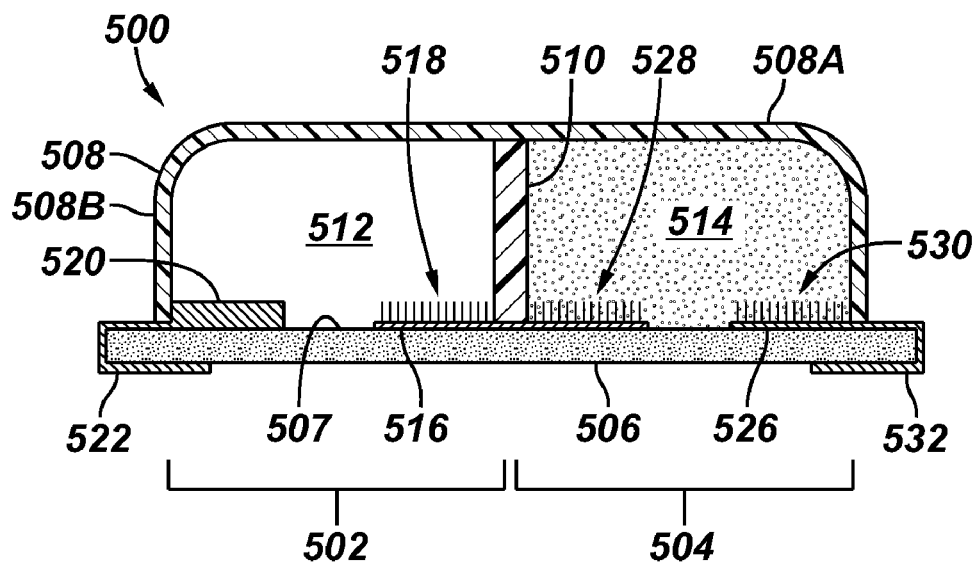
FIG. 5 is a side sectional view of another embodiment of a combined nano-diode and nano-switch for use in the detonator circuit of FIG. 2.
Figure 6:
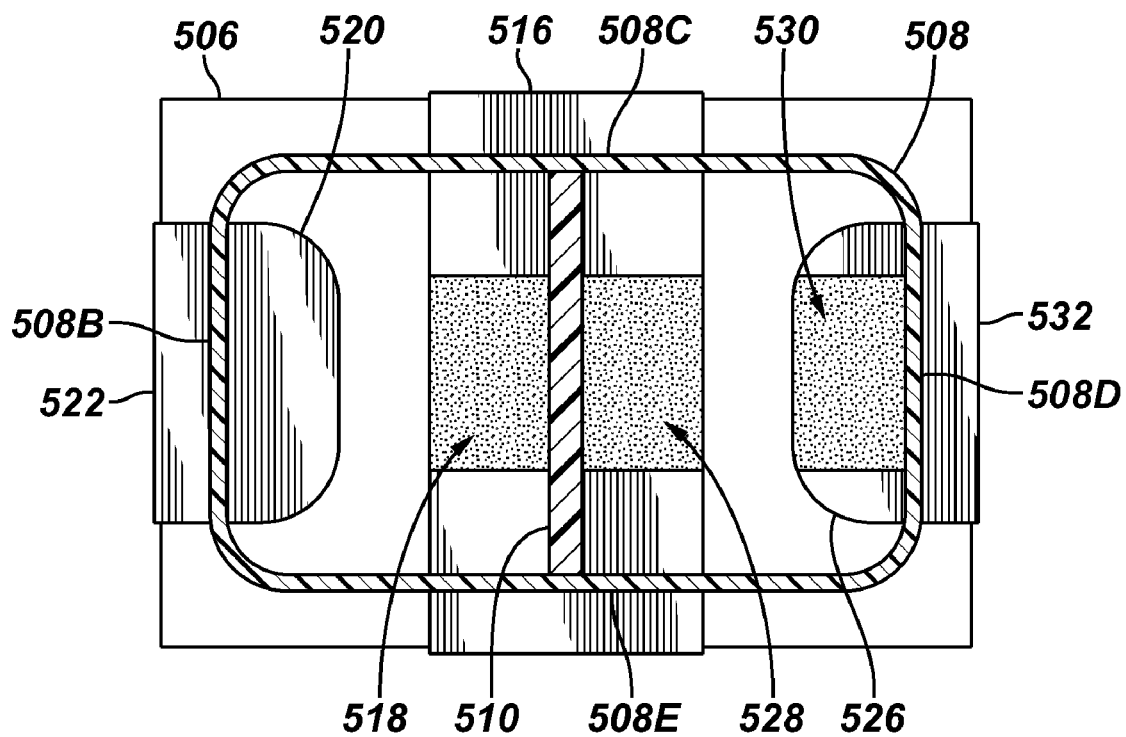
FIG. 6 is a top cross-sectional view of the combined nano-diode and nano-switch of FIG. 5.

FIGS. 5 and 6 illustrate an alternative embodiment of an assembly 500 that includes a combined nano-diode 502 and nano-switch 504 according to a planar geometry design. The assembly 500 includes a substrate 506 and a separator 510 (formed of an electrically insulating material) provided on the substrate 506. A generally bowl-shaped cover 508 is also provided on the substrate 506, with the cover 508 and the substrate 506 defining an inner space. The generally bowl-shaped cover 508 has a top wall 508A and side walls 508B-508E that enclose the inner space. The separator 510 divides the inner space into two separate chambers 512 and 514, where chamber 512 is part of the nano-diode 502, and the chamber 514 is part of the nano-switch 504. The chamber 512 of the nano-diode 502 contains a vacuum (or alternatively a gas), whereas the chamber 514 of the nano-switch 504 contains a gas.

A common electrode 516 is formed over a portion of the upper surface 507 of the substrate 506. The common electrode 516 is shared by the nano-diode 502 and the nano-switch 504. On the nano-diode 502 side of the assembly 500, nano-emitters 518 are formed over a segment of the electrode 516 that is part of the nano-diode 502. The electrode 516 forms the cathode electrode of the nano-diode 502. Also, the nano-diode 502 includes an anode electrode 520 formed on another portion of the upper surface 507 of the substrate 506. The anode electrode 520 is electrically connected to a connection pad 522. Note that the anode electrode 520 and cathode electrode 516 have a lateral arrangement, both on the upper surface 507 of the substrate 506.

On the nano-switch 504 side of the assembly 500, the electrode 516 forms one node of the nano-switch, while another electrode 526 formed on a different portion of the upper surface 507 of the substrate 506 forms another node of the nano-switch 504. The nano-switch 504 further includes nano-emitters 528 and 530 formed on respective surfaces of the electrodes 516 and 526. The electrode 526 is electrically connected to a connection pad 532.

The common electrode 516 forms the common node (e.g., 206 in FIG. 2) between the nano-diode 502 and nano-switch 504. The connection pad 522 is coupled to a first component (e.g., 204 of FIG. 2), whereas the connection pad 532 is electrically connected to another component (e.g., initiator 210 in FIG. 2).

The planar geometry design of FIGS. 5 and 6 provides benefits for manufacturing and application. The spacing between electrodes 516, 520, and 526 is controlled on a single surface (surface 507), and greater tolerances are allowed for the dimensions and material selected for the insulators (510), chamber enclosure sides (508A-508E, 510), and cover (508). Assembly onto a circuit board or into an integrated package is also facilitated because the external connections are made on a single surface. Semiconductor and microcircuit fabrication techniques can be used in the manufacture of the nano-diode and/or nano-switch. The integrated and compact features of some embodiments of the invention facilitate miniaturization, ease of packaging, and low cost-high volume production.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. An apparatus comprising:
a component for use in a wellbore;
a nano-diode coupled to the component to enable activation of the component, wherein the nano-diode comprises an electrode and nano-emitters formed on the electrode, the nano-emitters to emit electrons.

2. The apparatus of claim 1, wherein the nano-diode includes nanotechnology features.

3. The apparatus of claim 1, further comprising a nano-switch electrically coupled to the nano-diode.

4. The apparatus of claim 1, wherein the nano-emitters comprise nanotubes.

5. The apparatus of claim 4, wherein the nanotubes comprise one of carbon nanotubes, silicon nanotubes, molybdenum nanotubes, titanium nanotubes, and boron nitride nanotubes.

6. The apparatus of claim 1, wherein the nano-emitters comprise nano-sized diamonds.

7. The apparatus of claim 1, further comprising an integrated assembly of the nano-diode and a nano-switch electrically coupled to the nano-diode.

8. The apparatus of claim 7, wherein the integrated assembly comprises an electrode shared by the nano-diode and nano-switch.

9. The apparatus of claim 7, wherein the integrated assembly comprises a spacer to define a first chamber for the nano-diode and a second, separate chamber for the nano-switch.

10. The apparatus of claim 9, wherein the first chamber contains a vacuum, and the second chamber contains a dielectric gas.

11. The apparatus of claim 7, wherein the integrated assembly comprises a substrate on which the nano-diode and nano-switch are formed.

12. The apparatus of claim 11, wherein the integrated assembly further comprises a generally bowl-shaped cover to cover components of the nano-diode and nano-switch.

13. The apparatus of claim 12, wherein the bowl-shaped cover defines a hermetically sealed inner space with at least the substrate.

14. The apparatus of claim 7, wherein the electrode comprises a common electrode shared by the nano-diode and nano-switch, wherein the nano-emitters of the nano-diode are formed on a segment of the common electrode that is part of the nano-diode.

15. The apparatus of claim 14, wherein the nano-diode further comprises a second electrode spaced apart from the common electrode, wherein electron emission from the nano-emitters on the common electrode causes current flow between the common electrode and second electrode.

16. The apparatus of claim 15, wherein the nano-switch further comprises a third electrode spaced apart from the common electrode.

17. The apparatus of claim 1, wherein the component comprises an explosive.

18. The apparatus of claim 1, wherein the electrode of the nano-diode is a first electrode, and the nano-diode further comprises a second electrode laterally spaced apart from the first electrode, the nano-diode further comprising a substrate having a surface, both the first and second electrodes provided on the surface.

19. The apparatus of claim 1, wherein the component comprises any one of an exploding foil initiator (EFI), an exploding bridgewire (EBW) initiator, and a semiconductor bridge (SCB) initiator.

20. The apparatus of claim 1, wherein the nano-switch comprises nano-emitters.

21. The apparatus of claim 1, further comprising:
a substrate on which the electrode is provided;
a spacer on the substrate; and
a cover on the spacer, wherein an assembly of the substrate, the spacer, and the cover form a hermetically sealed chamber in which the nano-diode is provided.

22. The apparatus of claim 21, wherein the hermetically sealed chamber is filled with a vacuum.

23. The apparatus of claim 21, wherein the hermetically sealed chamber is filled with a dielectric gas.

24. The apparatus of claim 21, wherein the electrons of the emitters are to flow through the hermetically sealed chamber.

25. The apparatus of claim 21, further comprising another electrode attached to the cover, wherein a current is to flow between the electrodes through the hermetically sealed chamber.

* * * * *